(12) United States Patent
Eriksson et al.

(10) Patent No.: US 11,061,251 B2
(45) Date of Patent: Jul. 13, 2021

(54) HINGE BETWEEN A FRAME AND A TEMPLE OF SPECTACLES

(71) Applicant: Skugga Technology AB, Stockholm (SE)

(72) Inventors: Mikael Eriksson, Hägersten (SE); Daniel Eriksson, Stockholm (SE); Jonas Eriksson, Huddinge (SE); Fredrik Hanson, Stockholm (SE); Kristina Ahlinder, Stockholm (SE)

(73) Assignee: SKUGGA TECHNOLOGY AB, Stockholm (SE)

(*) Notice: Subject to any disclaimer, the term of this patent is extended or adjusted under 35 U.S.C. 154(b) by 296 days.

(21) Appl. No.: 16/342,606

(22) PCT Filed: Oct. 25, 2017

(86) PCT No.: PCT/SE2017/051051
§ 371 (c)(1),
(2) Date: Apr. 17, 2019

(87) PCT Pub. No.: WO2018/084772
PCT Pub. Date: May 11, 2018

(65) Prior Publication Data
US 2019/0265510 A1 Aug. 29, 2019

(30) Foreign Application Priority Data
Nov. 1, 2016 (SE) .................................... 1651438-2

(51) Int. Cl.
*G02C 5/22* (2006.01)
*H01R 35/02* (2006.01)
*G02C 5/14* (2006.01)

(52) U.S. Cl.
CPC ............. *G02C 5/22* (2013.01); *G02C 5/2209* (2013.01); *G02C 5/2272* (2013.01); *H01R 35/02* (2013.01); *G02C 5/146* (2013.01)

(58) Field of Classification Search
CPC ...... G02C 5/22; G02C 5/2272; G02C 5/2281; G02C 5/2236; G02C 5/229
(Continued)

(56) References Cited

U.S. PATENT DOCUMENTS 3,796,482 A 3/1974 Blumenthal
4,488,792 A 12/1984 Wagner
(Continued)

FOREIGN PATENT DOCUMENTS

DE 1121362 B1 1/1962
WO 0036454 A1 6/2000
WO 20130175367 A1 11/2013

OTHER PUBLICATIONS

International Search Report and Written Opinion from corresponding International Application No. PCT/SE2017/051051, dated Dec. 18, 2017; 12 pages.
(Continued)

*Primary Examiner* — Hung X Dang
(74) *Attorney, Agent, or Firm* — Tucker Ellis LLP (57) ABSTRACT

A hinge (4) between a frame (2) and a temple (3) of spectacles, rendering it possible for the temples (3) of the spectacles to be in a use and a store position, respectively. At least one electrical or optical cable (14) or wire is running between the frame and the temple, wherein the at least one cable or wire (14) will aim to follow a thought neutral bending plane through the hinge (4). The at least one cable or wire (14) is not stretched in the store position of the temples (3) nor crinkled in the use position. The hinge (4) has two axis connections, a first axis connection (5a) posi-
(Continued)

tioned at the frame (2) and a second axis connection (5*b*) positioned at the temple (3), and therebetween a connector (6) or at least one central part (7).

15 Claims, 13 Drawing Sheets

(58) Field of Classification Search
USPC .............................. 351/158, 153, 41; 16/228
See application file for complete search history.

(56) References Cited

U.S. PATENT DOCUMENTS

| | | |
|---|---|---|
| 5,258,784 A | 11/1993 | Baines |
| 5,606,743 A | 2/1997 | Vogt |
| 6,099,117 A * | 8/2000 | Gregory ................. G02C 7/101 351/153 |
| 6,168,341 B1 | 1/2001 | Chene |
| 2011/0273660 A1 | 11/2011 | Tada et al. |
| 2011/0292334 A1 | 12/2011 | Medana |
| 2012/0002159 A1 | 1/2012 | Blum |
| 2015/0226985 A1 | 8/2015 | Jones |

OTHER PUBLICATIONS

Extended European Search Report and Written Opinion from corresponding European Patent Application No. 17867724.1, dated Oct. 7, 2019; 8 pages.

* cited by examiner

HINGE BETWEEN A FRAME AND A TEMPLE OF SPECTACLES

The present invention concerns a hinge between a frame and a temple of spectacles, rendering it possible for the temples of the spectacles to be in a use and a store position, respectively, preferably wherein at least one electrical or optical cable or wire is running between the frame and the temple.

BACKGROUND ART

Spectacles comprising electronics are previously known. It is for example known to have frames with lenses, which are electrically driven and controlled, that can for example switch between a clear and a tinted mode. For example, when a battery or control circuit is positioned at at least one temple a connecting cable must pass a hinge between the frame and the temple.

Spectacles usually are in either of two positions, a use position when the temples are more or less directed 90 degrees out from the lenses in the frame, and a store position when the temples are bent via the hinges to rest towards the inside of the frame, more or less parallel to the frame with the lenses.

Several problems arise when having a cable reaching between the frame and the temples. First of all, there is mechanical issues of stretching or crinkling of the cable when changing position between the use and store position. Also, the bending can be a problem if repeatedly bending occurs with a large deflection angle from the straight position when the temples are in the use position to the store position. Generally, such as deflection could be up to 90 degrees. These mechanical issues seriously influence adversely the durability of the cable. A further problem is that the cable will be seen and be unprotected when the temple is in the store position.

SUMMARY OF THE INVENTION

The present invention aims at solving or at least delimiting these problems. In addition, further problems will also be solved.

According to a first aspect of the invention a hinge between a frame and a temple of spectacles is provided, rendering it possible for the temples of the spectacles to be in a use and a store position, respectively. At least one electrical or optical cable or wire is running between the frame and the temple but the at least one cable is not stretched in the store position of the temples nor crinkled in the use position.

According to an embodiment of the invention the at least one cable has a length between a predetermined position in the frame and a predetermined position in the temple corresponding to the length along the frame, hinge and temple between the predetermined positions in the use position, i.e. no excessive length for compensating for the bending at the hinge into the store position.

According to an embodiment the at least one cable will aim to follow a thought neutral bending plane through the hinge. According to mechanics when bending a beam, the outer surface will be stretched and the inner surface will be pressed. In between there is a neutral plane not being affected by the stretching or pressing forces. By letting the at least one cable follow this neutral bending plane as much as possible the at least one cable will not be affected by stretching forces nor crinkling forces from the frame, hinge and temple. Of course, the at least one cable will in itself be affected when it is bent but when seen in the perspective of the spectacle it will be more or less unaffected. The at least one cable may pass in and out through this plane but generally following it through the hinge.

According to an embodiment the at least one cable will be less bent or deflected in each point in the hinge than the temple will be deflected from the frame in the use position to the store position.

According to an embodiment the hinge comprises at least one separate, central part, connectable with the frame in its first side and with the temple in its second side, thus separating the total bending or deflection into at least two bends. Preferably, the at least one cable will be bent or deflected in the hinge from a straight position less than 45 degrees, preferably less than 40 degrees and most preferred less than 35 degrees in any point through the hinge at the store position.

According to an embodiment the at least one central part has a recess for the cable, going between the first side to its second side, facing an inside or an outside of the hinge. As an alternative, the recess is instead a throughgoing hole. Preferably, the at least one cable may run freely in the recess or throughgoing hole. Thus, it will not take up any forces and the hinge does not depend on the cable for its mechanical function.

According to an embodiment the frame and the temple has corresponding cogs meshing with each other at the hinge for a controlled movement between the use and the store position. Preferably, the cogs are provided both above and below the central part.

According to an embodiment at least one spring element is providing a clamping connection between the frame and the temple at the hinge. The at least one spring element provides possibilities such as over flexing, i.e. bending outwards so that the temple and the frame generally show an angle there between of more than 90 degrees; and snapping movement for the temple when moving it into the store position. Preferably, at least two spring elements are provided, for example one above and one below the at least one central part.

According to an embodiment the at least central part is connected in its first end at an axis connection at the frame in the vicinity of the hinge and in its second end at an axis connection at the temple in the vicinity of the hinge.

According to an embodiment attachment points of the at least one clamping spring are provided in a plane positioned outwards of a thought rotational axis between the frame and temple when the temple is in the use position so that the at least one spring will extend between the two attachment points during the movement of the temple into the store position until the thought rotational axis between the frame and the temple is reached, thereafter the spring may retract and a snapping movement of the temple towards the store position occurs.

According to an embodiment play in an axis connection between the frame and the central part or in an axis connection between the temple and the central part or in both axis connections is present. This play makes it possible to deflect the temple outwards against the clamping force of the at least one spring.

According to a further aspect on the present invention it is provided a hinge for a spectacle, positioned between a frame and a temple, rendering it possible for the temples of the spectacles to be in a use and a store position, respectively, having at least one clamping spring providing a clamping connection between the frame and the temple by means of a first attachment point at the frame and a second attachment point at the temple, wherein the two attachment points are provided in a plane positioned, when the temple is in the use position, outwards of a thought rotational axis between the frame and the temple so that the at least one spring will extend between the two attachment points during the movement of the temple into the store position until the thought rotational axis between the frame and the temple is reached, thereafter the spring may retract and a snapping movement of the temple towards the store position occurs.

According to an embodiment the hinge has an axis at the temple in the vicinity of the hinge and an axis at the frame in the vicinity of the hinge, wherein at least one connector connects the two axes.

The at least one connector may be a central part provided between the frame and temple or be a link above or underneath, or preferably one on each side, of the frame and temple. The connector may be provided with an axle protrusion cooperating with a recess or hole in the temple and frame, respectively, making up an axis connection. Or, vice versa, the connector may have a recess or hole cooperating with an axle protrusion of the temple and frame, respectively.

According to an embodiment of this aspect of the invention the frame and the temple has corresponding cogs meshing with each other at the hinge for a controlled movement between the use and the store position. Preferably, the cogs are provided both above and below the central part.

According to an embodiment an over flexing function is provided, where the temple deflects outwards in the use position. This can be provided by means of play in the axis connection between the frame and connector and in the axis connection between the temple and the connector, respectively. This play makes it possible to bend the temple outwards against the clamping force of the at least one spring.

SHORT DESCRIPTION OF THE APPENDED DRAWING

The present invention will now be described in more detailed under referral to the appended drawing, in which.

DETAILED DESCRIPTION OF EMBODIMENTS OF THE INVENTION

References to upper, lower, inner, outer and so on are referring to spectacles in a use position when a person is wearing the spectacles, looking through the lenses, standing up straight. Sides facing the face are inner sides and the opposite are outer sides. Sides facing the ground are lower sides and the opposite upper sides. A hinge according to the present invention may be embedded inside the spectacles, i.e. between inner and outer sides of a frame and a temple.

Figure 1A:
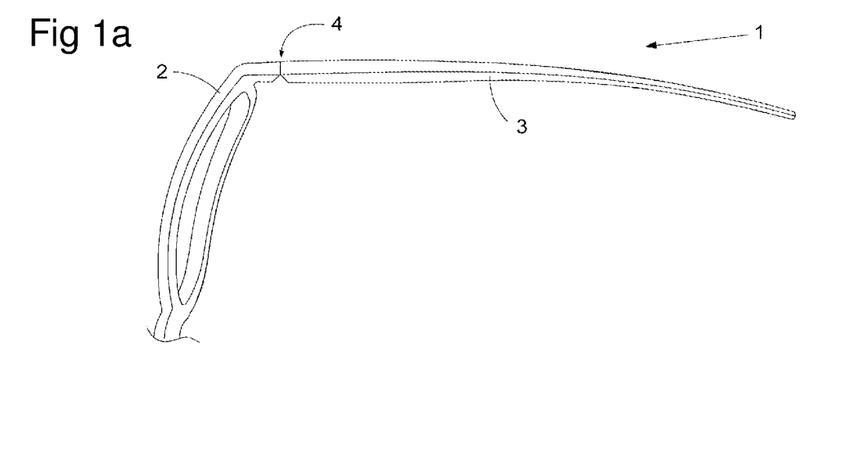
FIG. 1a shows a portion of a spectacle having a frame and a temple, in a use position, from above.
Figure 1B:
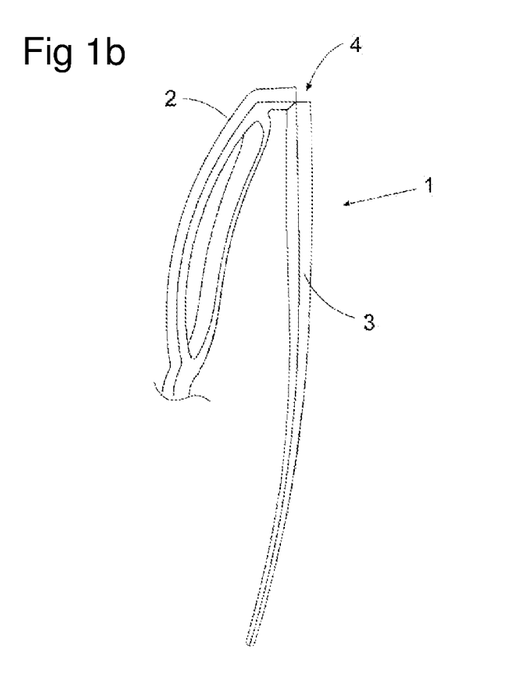
FIG. 1b shows a portion of a spectacle having a frame and a temple, in a store position, from above.
Figure 1C:
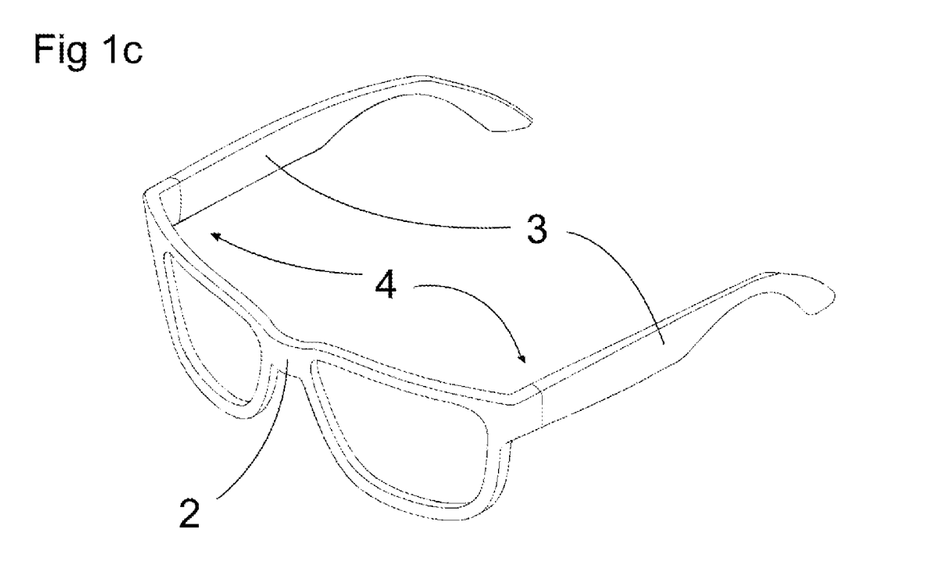
FIG. 1c shows an embodiment of a spectacle of the present invention in a perspective view.

In FIG. 1a and b a portion of a spectacle 1 is shown having a frame 2 and a temple 3 and there between an embodiment of a hinge 4 of the invention, which is embedded in the frame 2 and temple 3 when the temple 3 is in a use position as shown in FIG. 1a. In FIG. 1b the temple 3 is in a store position. In the use position the spectacles are wearable and in the store position they are not in use. In FIG. 1c the spectacles 1 are shown in full in a perspective view.

Figure 2A:
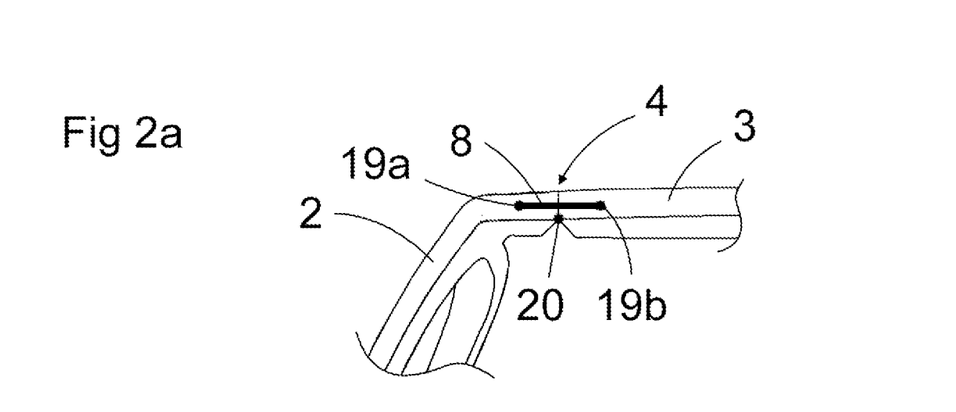
FIG. 2a,b,c show an embodiment of a hinge having a spring in a use position, a maximum spring extension position and a store position, respectively, all from above.
Figure 2B:
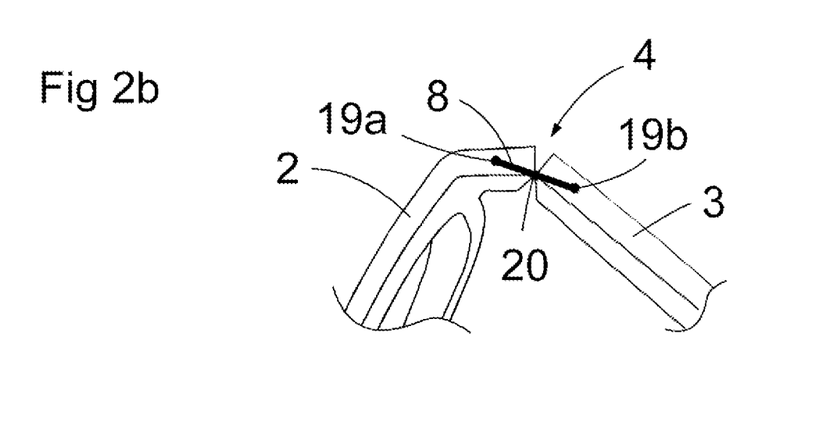
Figure 2C:
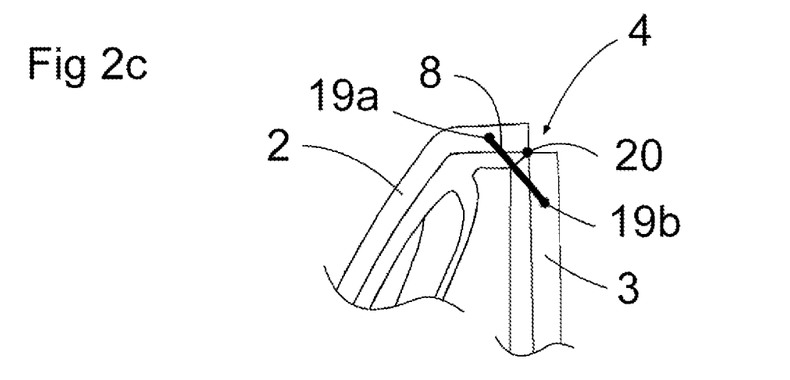

In FIG. 2a,b and c an embodiment of the present invention is shown where the hinge 4 has at least one clamping spring 8 providing a clamping connection between the frame 2 and the temple 3. The spring 8 is attached in the hinge 4 by means of a first attachment point 19a at the frame 2 and a second attachment point 19b at the temple 3. The two attachment points 19a,b are provided in a plane positioned, when the temple 3 is in the use position, outwards of a thought rotational axis 20 between the frame 2 and the temple 3. The at least one spring 8 will extend between the two attachment points 19a,b, during the movement of the temple 3 into the store position, until the thought rotational axis 20 between the frame and the temple is reached, see FIG. 2b. Thereafter the spring may retract and a snapping movement of the temple 3 towards the store position occurs.

Figure 3A:
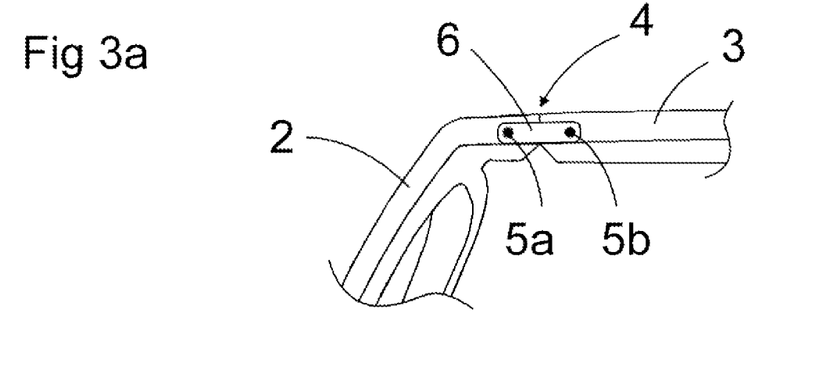
FIG. 3a,b show an embodiment of a hinge of the present invention in use and store positions, respectively, from above.
Figure 3B:
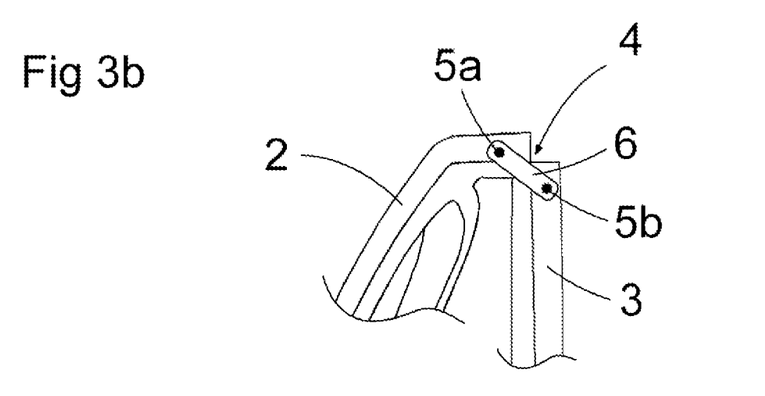

In FIG. 3a and b an embodiment of a hinge 4 of the present invention is shown having two axis connections 5a and 5b. A first axis connection 5a is an axis positioned at the frame 2 in the vicinity of the hinge 4. A second axis connection 5b is positioned at the temple 3 in the vicinity of the hinge 4. A connector 6 is connecting the frame 2 with the temple 3 at least from the first axis connection 5a to the second axis connection 5b. In the shown embodiment in FIG. 3a and b the connector 6 is positioned on the upper side of the hinge 4. The connector 6 may of course be positioned on the lower side instead, or on both the upper and lower sides. According to a further embodiment the connector 6 may be positioned within the hinge 4, more or less centrally between the upper and lower sides, see below.

Figure 4A:
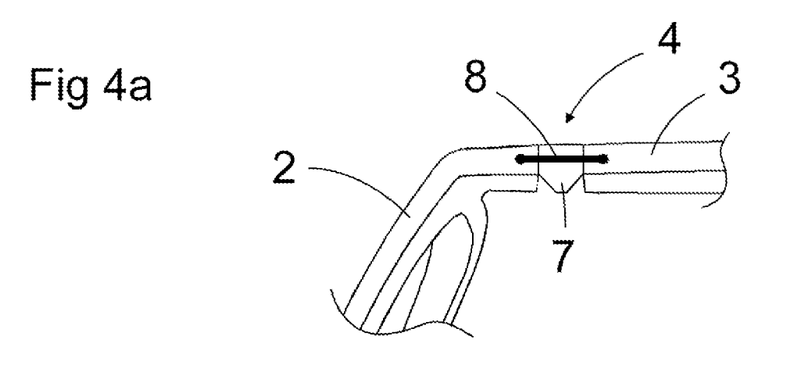
FIG. 4a,b show an embodiment of a hinge of the present invention in use and store positions, respectively, from above.
Figure 4B:
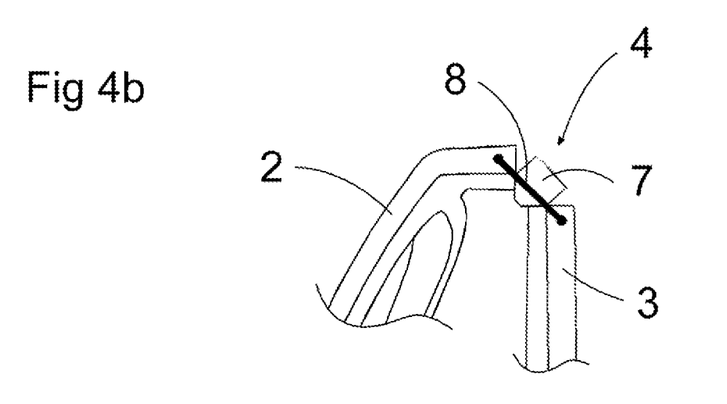

In FIG. 4a and b an embodiment of a hinge 4 of the present invention is shown where a central part 7 is arranged between the frame 2 and the temple 3. The frame 2 and temple 3 are interconnected, with the central part 7 there between, by means of a spring 8, which is clamping the frame 2 and the temple 3 together. The spring 8 could be of an elastic material or a metal bent into a shape providing a clamping force when mounted at the frame 2 and temple, respectively. It is conceivable to have more than one central part 7.

Figure 4C:
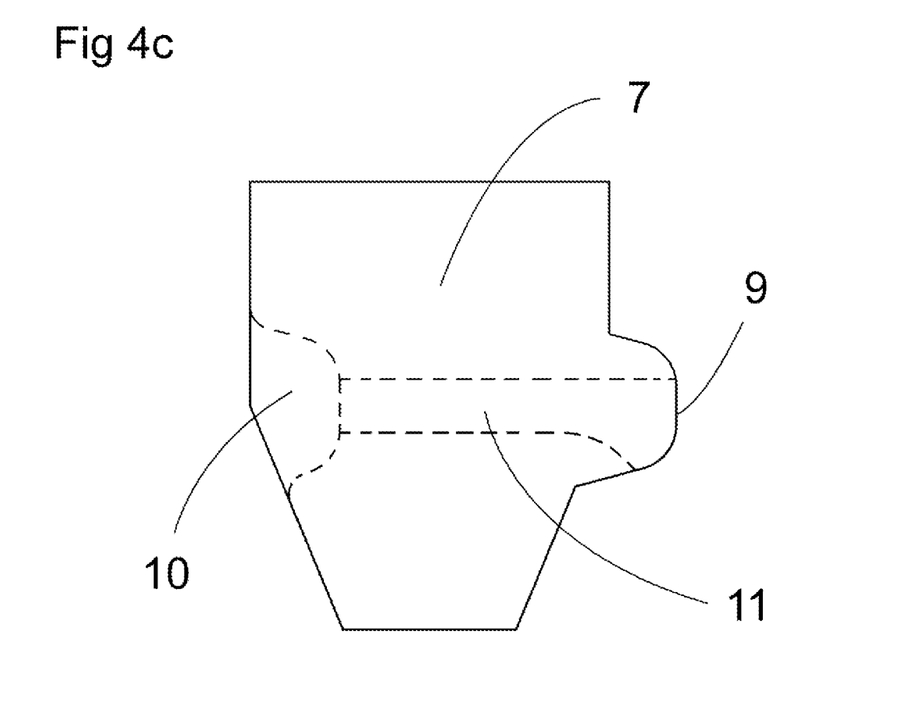
FIG. 4c shows an embodiment of a central part of a hinge of the present invention, from above.

The central part 7 in the embodiment of FIG. 4c has a protrusion 9 at least on one side facing the frame 2 or the temple 3. The protrusion 9 may cooperate with a recess in the frame 2 or the temple 3 so that the central part will not slide out of the hinge 4. On the opposite side, the central part 7 may have a recess 10 cooperating with a protrusion in the frame 2 or temple 3. It is of course conceivable to provide the central part with only protrusions 9 or only recesses 10, and thus the opposite form in the frame 2 and temple 3, or a mix thereof.

Through the central part 7 it is possible to have a throughgoing hole 11 for at least one cable, for example an electrical or optical cable or wire, or especially a flex cable. Instead of a hole 11 it is conceivable to have a recess on the outer side or the inner side (not shown). Preferably, the cable may run freely in the hole or recess.

Spectacles comprising electronics for example having frames with lenses, which are electrically driven and controlled, for example may switch between a clear and a tinted mode, may comprise at least one cable. For example, when a battery or control circuit is positioned at at least one temple at least one connecting cable must pass the hinge 4 between the frame 2 and the temple 3.

Several problems arise when having at least one cable or wire reaching between the frame and the temples. First of all, there is mechanical issues of stretching or crinkling of the at least one cable when changing position between the use and store position. Also, the bending can be a problem if repeatedly bending occurs with a large deflection angle from the straight position when the temples are in the use position to the store position. Generally, such as deflection could be up to 90 degrees. These mechanical issues seriously influence adversely the durability of the at least one cable.

An electrical or optical cable 14, for example a flex cable, is running between the frame 2 and the temple 3. See FIG. 7a,b, but cable 14 is not stretched in the store position of the temples 3 nor crinkled in the use position. The cable 14 has a length between a predetermined position in the frame 2 and a predetermined position in the temple 3 corresponding to the length along the frame 2, hinge 4 and temple 3 between the predetermined positions in the use position, i.e. no excessive length for compensating for the bending at the hinge 4 into the store position.

Figure 5:
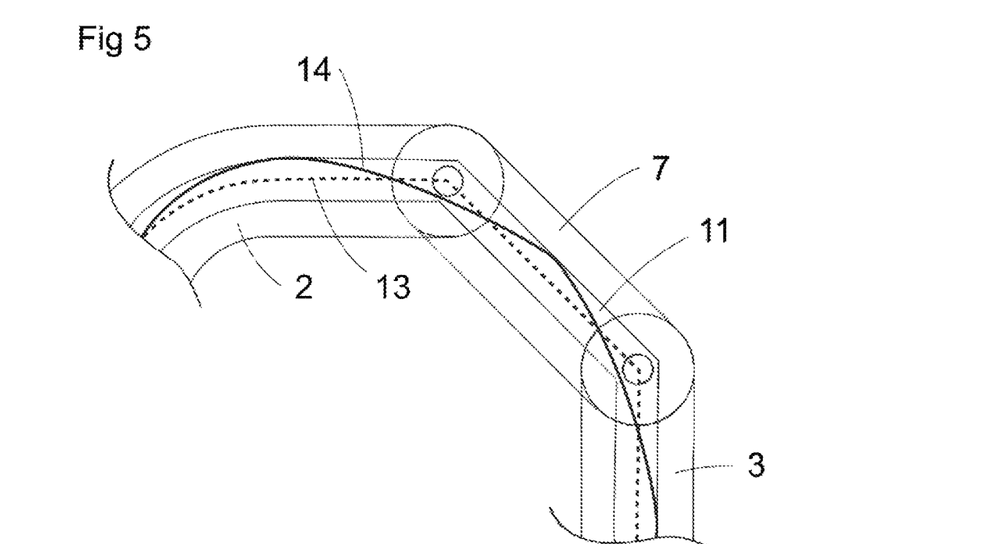
FIG. 5 shows the functionality of a neutral bending plane through the hinge of the present invention, from above.

A way to provide this is to let the cable 14 to follow a thought neutral bending plane 13 through the hinge 4, see FIG. 5. According to mechanics when bending a beam, the outer surface will be stretched and the inner surface will be pressed. In between there is a neutral plane not being affected by the stretching or pressing forces. This forms the basis of the solution. By letting the cable 14 follow this neutral bending plane 13 as much as possible the cable 14 will not be affected by stretching forces nor crinkling forces of the frame 2, hinge 4 and temple 3. Of course, the at least one cable 14 will in itself be affected when it is bent but when seen in the perspective of the spectacle it will be more or less unaffected. The cable 14 may pass in and out through this plane but generally following it through the hinge 4.

Preferably, the cable 14 will be less bent or deflected in each point in the hinge 4 than the temple 3 will be deflected from the frame 3 in the use position to the store position.

In FIG. 4a,b,c the separate, central part 7 is connectable with the frame 2 in its first side and with the temple 3 in its second side, thus separating the total deflection into at least two deflections, thus dividing the deflection degrees into two deflections of less degrees each than without the central part 7, which two deflections in sum corresponds to the degrees without the central part 7. If the total angle of deflection when the temple 3 is put in the store position is 90 degrees, each of the divided deflections may be 45 degrees. I.e. the deflection of the central part 7 from the frame may be 45 degrees and the deflection of the temple 3 from the central part 7 may be 45 degrees. It is conceivable to divide the degrees into non equal deflections, too.

Preferably, the cable 14 will bent or deflected in the hinge 4 from a straight position less than 45 degrees, preferably less than 40 degrees and most preferred less than 35 degrees in any point through the hinge at the store position, as can be seen in FIG. 5. If space is provided for the cable 14 through the hinge 4 it may straighten out the bends being situated at the outer wall in the frame 2, passing the apex (inner wall) of the bend between the frame 2 and the central part 7 and running to the outer wall of the throughgoing hole 11 in the central part 7, back to the apex of the bend between the central part 7 and the temple 3 and outwards towards the outer wall of the temple 3.

Figure 6A:
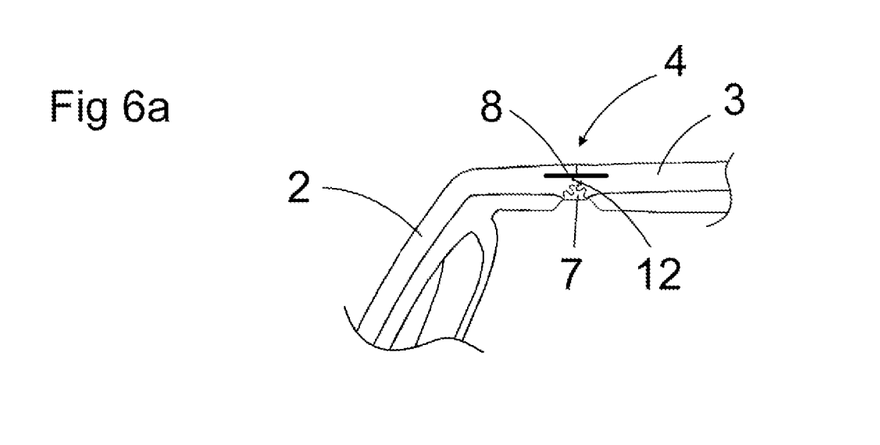
FIG. 6a,b show an embodiment of a hinge of the present invention in use and store positions, respectively, from above.
Figure 6B:
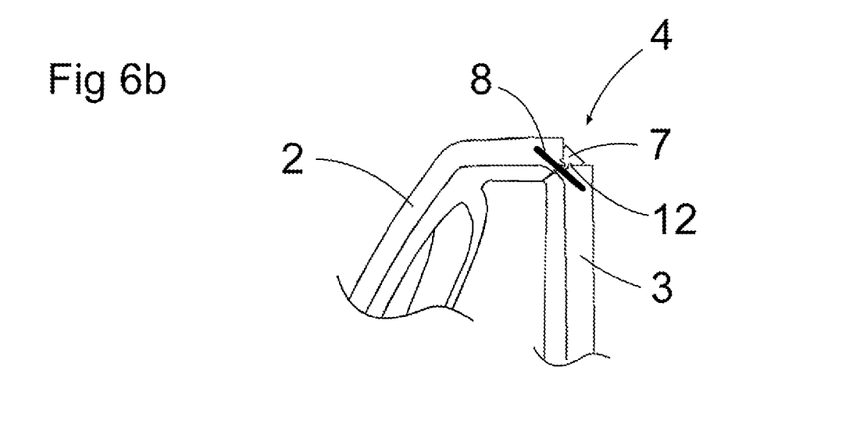
Figure 6C:
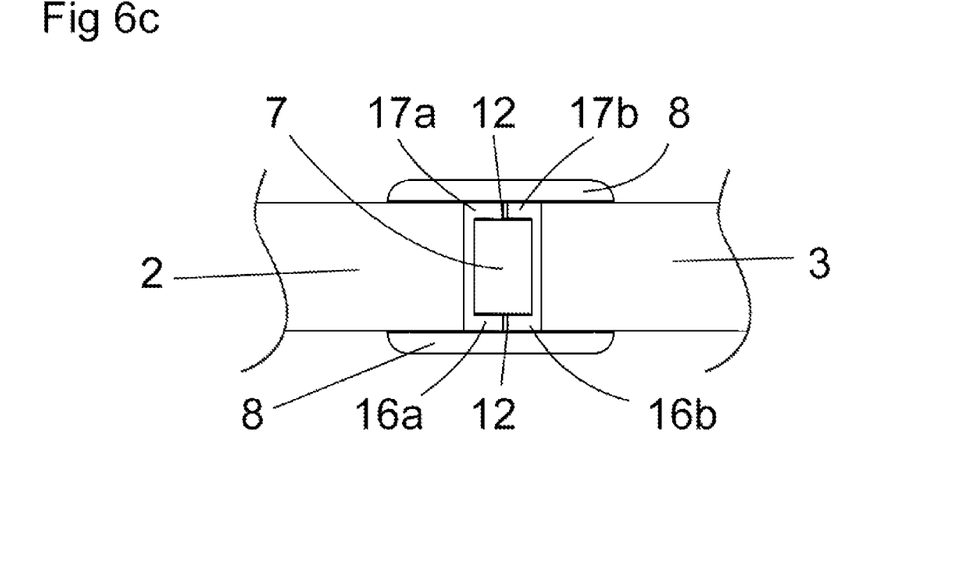
FIG. 6c shows the embodiment of FIGS. 6a,b from the outside of the spectacles in store position.

In FIG. 6a,b and c the central part 7 is more integrated in the hinge 4. Portions of the upper and lower sides 16, 17 of the frame 2 and the temple 3, respectively, reach over portions of the central part 7. In this embodiment the upper side portion 16a of the frame 2 is provided with cogs 12 meshing with cogs 12 on the upper side portion 16b of the temple 3. In this embodiment, also the lower side portions 17 are provided with meshing cogs 12. Because of the meshing cogs 12 a controlled movement may be performed between the use and store positions, respectively.

Figure 7A:
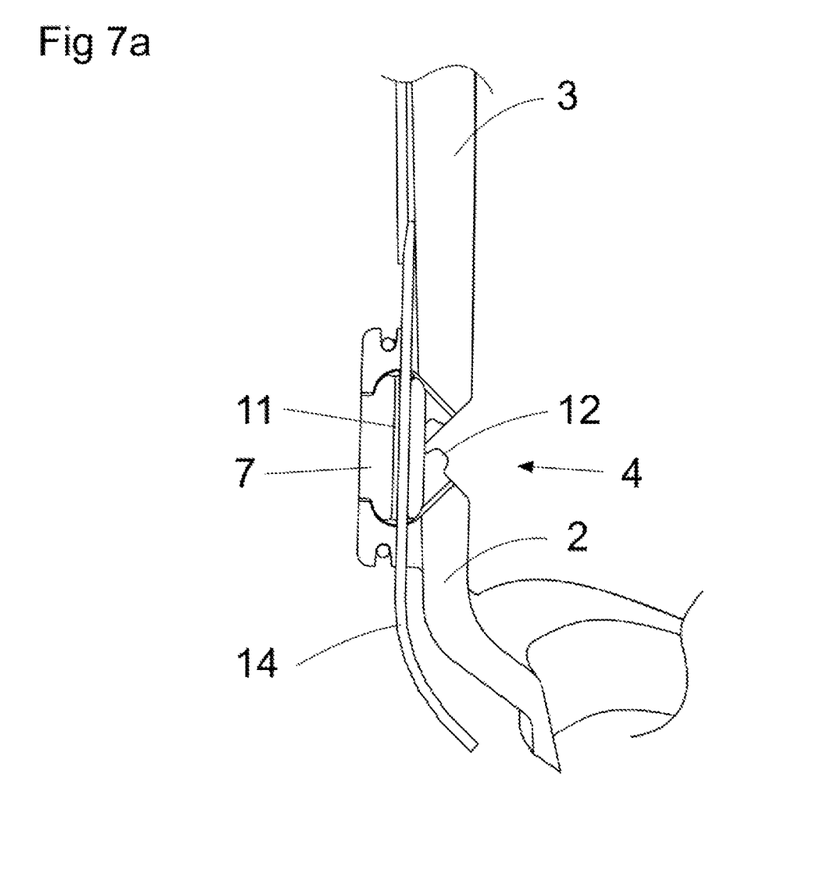
FIG. 7a,b show an embodiment of a hinge of the present invention in a cross sectional view in use and store positions, respectively, from above.
Figure 7B:
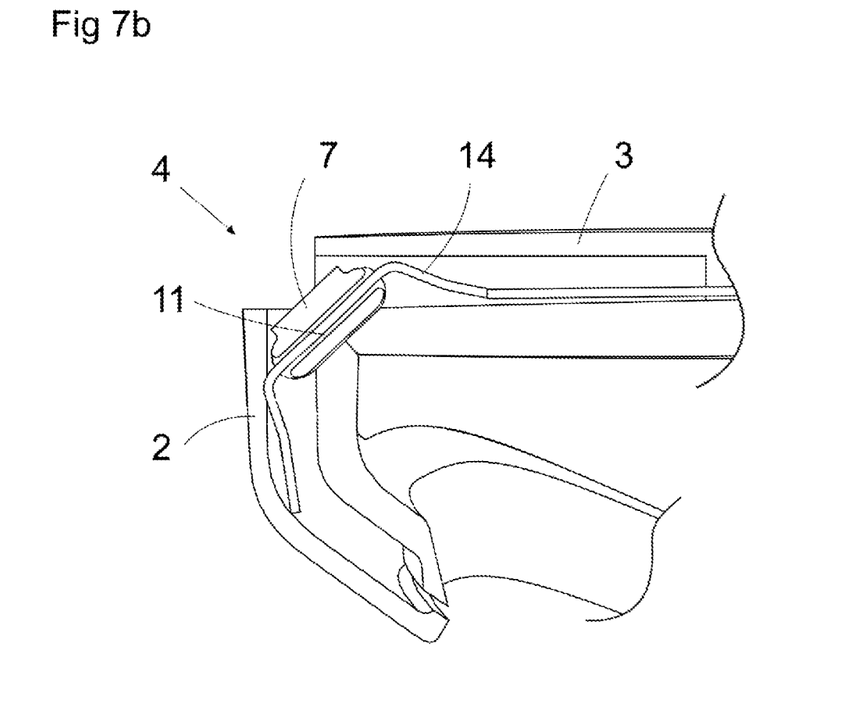
Figure 7C:
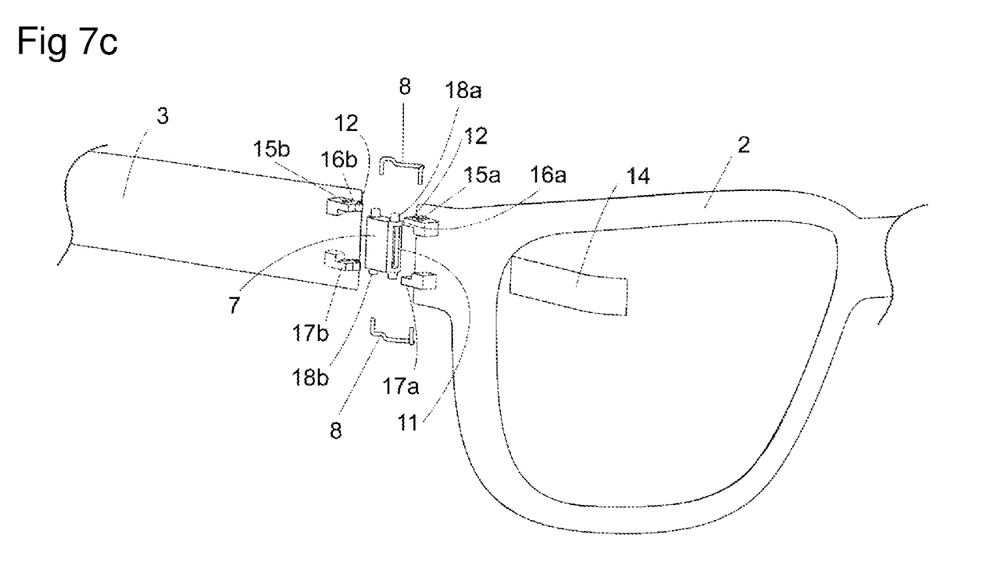
FIG. 7c shows an exploded view of the embodiment in FIGS. 7a,b, but without an outer side of the temple, from the outside of the spectacle.

In FIG. 7a and b an embodiment is shown in cross section in a parallel plane in between the upper and lower sides of the hinge 4. In FIG. 7c an exploded view is shown of this embodiment. The frame 2 is also here provided with upper and lower portions 16, 17 having meshing cogs 12. In this embodiment the upper and lower portions 16, 17 also comprises a recess 15, in this case a hole, for housing an axle protrusion 18 of the central part 7. Thus, the upper and lower axle protrusions 18a of the central part 7 makes up an axis connection 5a together with the recesses 15a of the upper 16a and lower 17a portions of the frame 2. Also the upper and lower axle protrusions 18b of the central part 7 makes up an axis connection 5b together with the recesses 15b of the upper 16b and lower 17b portions of the frame 3. It is also conceivable to have axle protrusions at the upper and lower portions 16, 17 of the frame 2 and temple 3 and matching recesses in the central part 7. Or a mix thereof. The axle protrusion 18 may for example be provided by means of screw. Springs 8 are provided both on the upper side and the lower side clamping the frame 2 and temple 3 together.

Figure 8A:
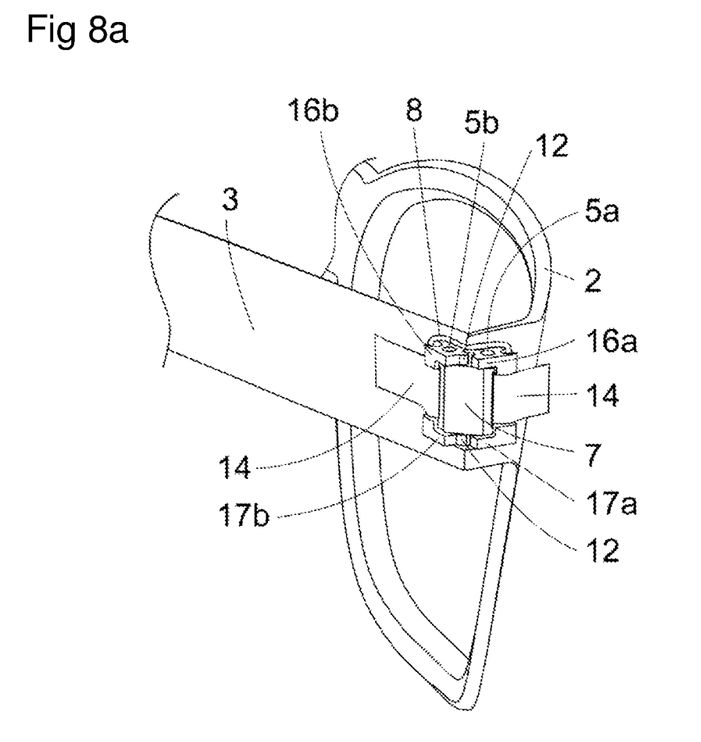
FIG. 8a shows an embodiment of the hinge of the present invention in the store position without an outer side of the temple and frame, from the outside of the spectacle.
Figure 8B:
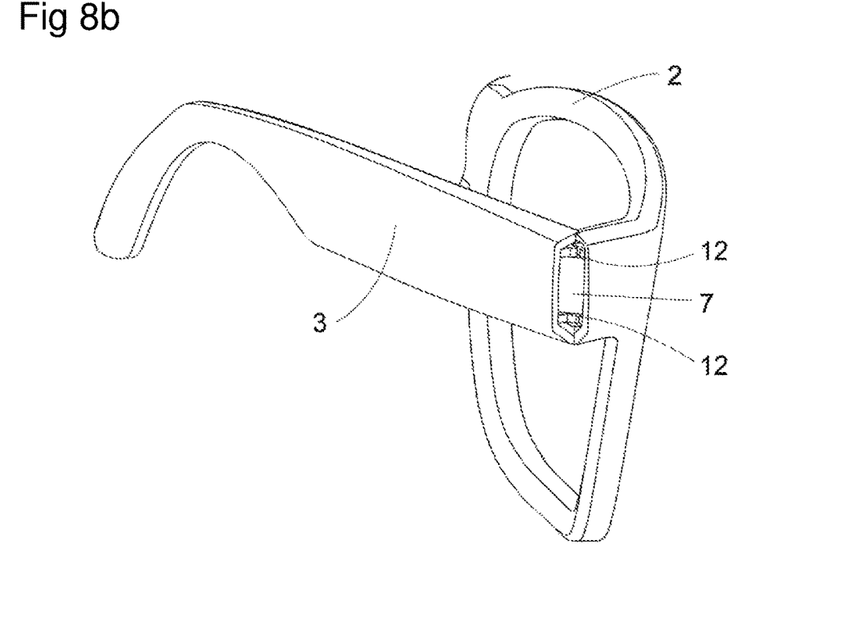
FIG. 8b shows an embodiment of the hinge of the present invention in the store position with an outer side of the temple and frame, from the outside of the spectacle.

In FIG. 8a an embodiment of the hinge 4 is shown in the store position from the outside but with removed outer sides of the frame and temple. The upper and lower portions 16, 17 may also be attached to the frame 2 and temple 3, respectively. Thus, the hinge 4 will be a separate device, which will be attachable in spectacles when it is desirable to have a hidden or embedded hinge. In FIG. 8b the outer sides of the frame 2 and temple 3 is arranged. In the store position, only a portion of the central part 7 and the meshing cogs 12 can be seen. Thus, the cable 14 is well protected. It gives also the spectacles a neat appearance.

Figure 9A:
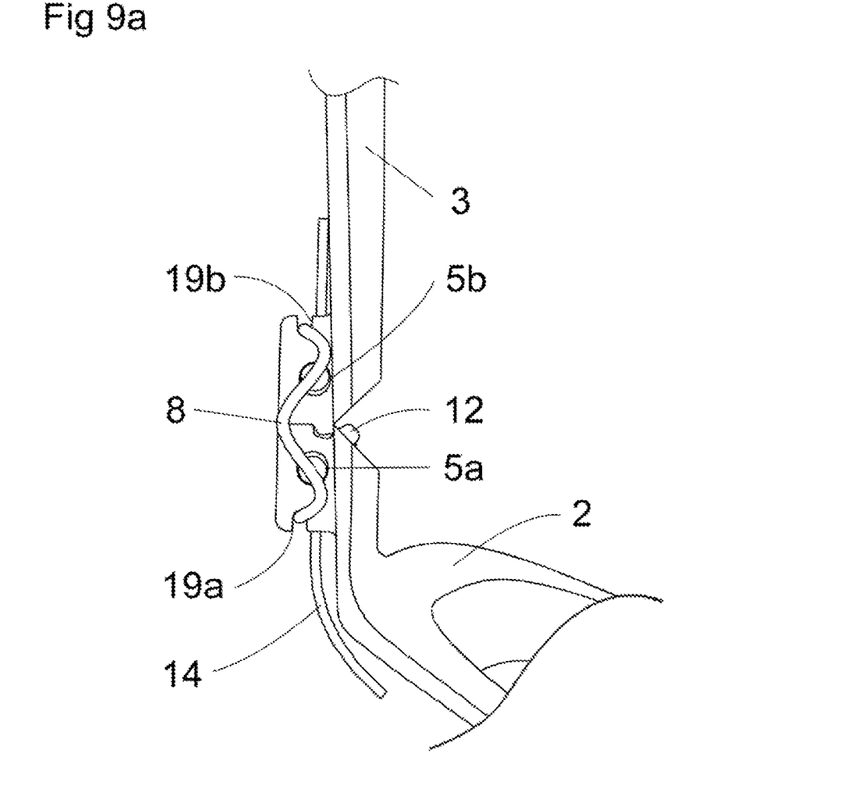
FIG. 9a,b show an embodiment of the hinge of the present invention in the use position and in a position where a clamping spring is in its most extended position, respectively, from above.
Figure 9B:
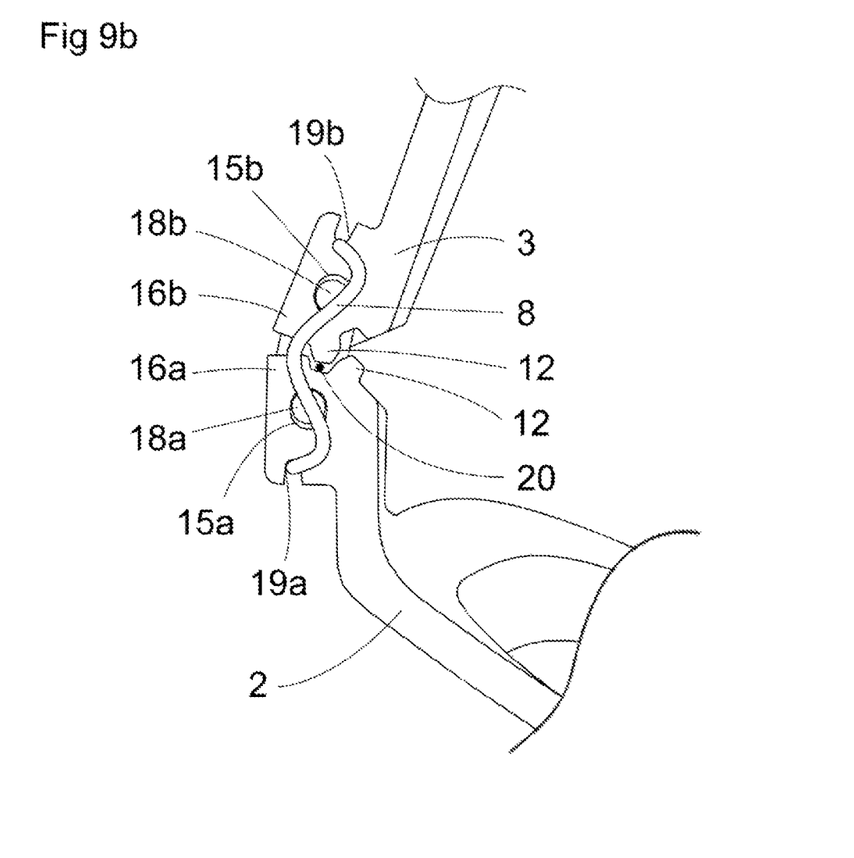

In FIG. 9a and b the spring 8 arrangement is shown. The clamping spring 8 is attached in two points, a first point 19a in the frame 2 and in a second point 19b in the temple 3. The attachment points 19a,b lies in a plane which is outside a thought rotational axis 20. When the temple 3 is moved towards the store position the clamping spring 8 will extended up to a maximum, which occurs when the plane comprising the spring attachment points 19a,b reaches the thought rotational axis 20 between the frame 2 and temple 3. When the temple 3 is further moved towards the store position the spring 8 starts to retract and a snapping movement will occur where the temple 3 rapidly moves to the store position. The shown shape of the spring 8 is preferred as it will not protrude or show in the hinge 4 when the temple 3 is in the store position.

Figure 10:
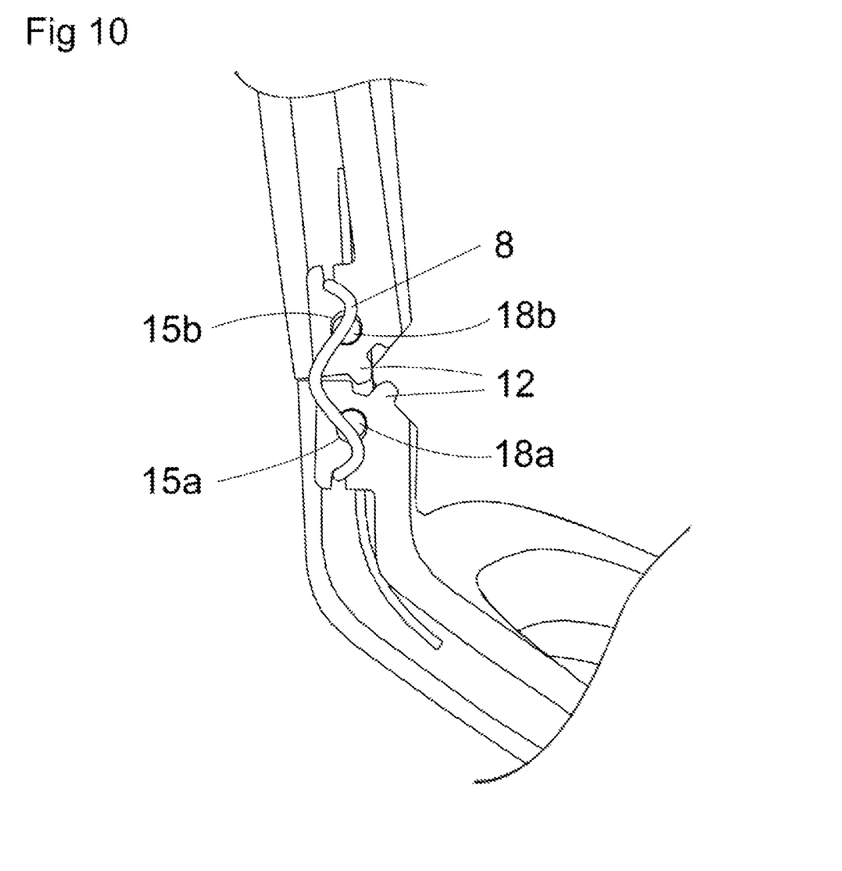
FIG. 10 shows an over flexing function of an embodiment of the hinge of the present invention, from above.

In FIG. 10 an over flex function is shown. Due to this the temple 3 may flex further outwards than the use position, which could delimit the risk of damage to the spectacle in case of an impact to the spectacle during use. This is provided by means of play in either the axis connection 5a between the frame 2 and central part 7 or in the axis connection 5b between the temple 3 and the central part 7; or play in both the axis connections 5a,b. This play makes it possible to bend the temple 3 outwards against the clamping force of the at least one spring 8. In the shown embodiment the axle protrusions 18a,b are movable in the holes 15a,b since the holes 15a,b are larger than the axle protrusions 18a,b.

A hinge for a spectacle, positioned between a frame and a temple, rendering it possible for the temples of the spectacles to be in a use and a store position, respectively, having at least one clamping spring providing a clamping connection between the frame and the temple by means of a first attachment point at the frame and a second attachment point at the temple, wherein the two attachment points are provided in a plane positioned, when the temple is in the use position, outwards of a thought rotational axis between the frame and the temple so that the at least one spring will extend between the two attachment points during the movement of the temple into the store position until the thought rotational axis between the frame and the temple is reached, thereafter the spring may retract and a snapping movement of the temple towards the store position occurs.

A hinge for a spectacle, wherein having an axis at the temple in the vicinity of the hinge and an axis at the frame in the vicinity of the hinge, wherein at least one connector connects the two axes and at least one spring provides a clamping connection between the frame and the temple.

A hinge for a spectacle, wherein the frame and the temple has corresponding cogs meshing with each other at the hinge for a controlled movement between the use and the store position. A hinge for a spectacle, wherein the cogs are provided both above and below the central part.

A hinge for a spectacle, wherein play in the axis connection between the frame and connector and in the axis connection between the temple and the connector, respectively.

A hinge for a spectacle, wherein the at least one connector is a link above or underneath, or preferably one on each side, of the frame and temple. A hinge for a spectacle, wherein the at least one connector is a central part provided between the frame and temple.

A hinge for a spectacle, wherein the connector is provided with an axle protrusion cooperating with a recess or hole in the temple and frame, respectively, making up an axis connection, or, vice versa, the connector has a recess or hole cooperating with an axle protrusion of the temple and frame, respectively.

All the shown hinges may be either a part of the frame and temple respectively, or be attachable to the frame and temple, respectively.

The invention claimed is:

1. A hinge between a frame and a temple of spectacles, rendering it possible for the temples of the spectacles to be in a use and a store position, respectively, wherein at least one electrical or optical cable or wire is running between the frame and the temple, the hinge has two axis connections, a first axis connection positioned at the frame and a second axis connection positioned at the temple, and there-between at least one central part, wherein that the at least one central part is arranged to let the at least one cable or wire aim to follow a thought neutral bending plane through the hinge and thus the at least one cable or wire is not stretched in the store position of the temples nor crinkled in the use position.

2. A hinge according to claim 1, wherein the at least one cable or wire has a length between a predetermined position in the frame and a predetermined position in the temple corresponding to the length along the frame, hinge and temple between the predetermined positions in the use position, i.e. no excessive length for compensating for the bending at the hinge into the store position.

3. A hinge according to claim 1, wherein the at least one cable or wire will be less bent or deflected in each point in the hinge than the temple will be deflected from the frame in the use position to the store position.

4. A hinge according to claim 1, wherein the hinge comprises at least one separate, central part connectable with the frame in its first side and with the temple in its second side, thus separating the total bending or deflection into at least two bends or deflections.

5. A hinge according to claim 1, wherein the at least one cable or wire will be bent or deflected in the hinge from a straight position less than 45 degrees, preferably less than 40 degrees and most preferred less than 35 degrees in any point through the hinge at the store position.

6. A hinge according to claim 1, wherein the at least one central part has a recess for the at least one cable or wire going between the first side to its second side, facing an inside or an outside of the hinge.

7. A hinge according to claim 6, wherein the recess instead is a throughgoing hole.

8. A hinge according to claim 6, wherein the at least one cable or wire runs freely in the recess or throughgoing hole.

9. A hinge according to claim 1, wherein the frame and the temple has corresponding cogs meshing with each other at the hinge for a controlled movement between the use and the store position.

10. A hinge according to claim 9, wherein the cogs are provided both above and below the at least one central part.

11. A hinge according to claim 1, wherein at least one clamping spring element is providing a clamping connection between the frame and the temple at the hinge.

12. A hinge according to claim 11, wherein at least two spring elements are provided, preferably one above and one below the central part.

13. A hinge according to claim 11, wherein the at least one central part is connected in its first end at an axis connection at the frame in the vicinity of the hinge and in its second end at an axis connection at the temple in the vicinity of the hinge.

14. A hinge according to claim 13, wherein attachment points of the at least one clamping spring are provided in a plane positioned outwards of a thought rotational axis between the frame and the temple when the temple is in the use position so that the at least one spring will extend between the two attachment points during the movement of the temple into the store position until the thought rotational axis between the frame and the temple is reached, thereafter the spring may retract and a snapping movement of the temple towards the store position occurs.

15. A hinge according to claim 1, wherein play in an axis connection between the frame and the at least central part and in an axis connection between the temple and the at least central part, respectively, is present.

* * * * *